Patented May 17, 1927.

1,628,979

UNITED STATES PATENT OFFICE.

HARRY M. HOOD, OF CHICAGO, ILLINOIS, ASSIGNOR TO FEATHEREDGE RUBBER COMPANY, INC., A CORPORATION OF ILLINOIS.

PROCESS OF UTILIZING FLEXIBLE MOLDS FOR PRODUCING SPONGE-RUBBER ARTICLES.

No Drawing. Application filed July 21, 1925. Serial No. 45,134.

In the copending application, Serial No. 731,640, filed on August 12, 1924, by myself and Frank V. Wedlock, as joint inventors, a process is described whereby sponge rubber articles having parts not in a common plane covered with fabric, can be produced by utilizing the expansive force generated in the rubber during curing to smooth out the fabric to the desired shape. I have now found that this principle can be carried to the point where the fabric may entirely replace the mold, and strips of great length can be produced without any mold or die, comprising sponge rubber covered with fabric.

The simplest embodiment of my invention consists in taking a long strip of cloth, folding it loosely about a strip of sponge rubber compound and then stitching the edges of the cloth together. The cloth and the compound can then be drawn progressively through an oven, which will cause the rubber to expand and will vulcanize it. The area within the fold of the cloth should be so proportioned to the amount and type of compound used that the cloth will be subjected to tension, but there will not be sufficient pressure to break the stitches.

Ordinarily, the product resulting from this process will be an approximately cylindrical strip of sponge rubber covered with cloth integrally united to it by vulcanization, and the length of the strip is limited only by the length of the cloth used, and of course two or more pieces of cloth can be sewn together to make a strip of substantially endless length, or two or more long pockets may be formed between a single set of cloth surfaces. If it is desired to produce a strip of sponge rubber free from the cloth, it is only necessary to sprinkle the interior surface of the cloth with powdered soapstone which will prevent the rubber from adhering to the cloth, so that the latter can readily be removed and re-used as a flexible mold.

The use of a flexible covering combined with a fixed die for curing sponge rubber is claimed in the co-pending application of Frank V. Wedlock, Serial No. 45,142, filed July 21, 1925.

What I claim is:

1. The process of producing sponge rubber bodies of extended length, which comprises the step of curing a strip of sponge rubber compound in a flexible mold of substantially greater cross sectional area than the cross sectional area of such compound.

2. A process as defined in claim 1, in which the mold is made of fabric.

3. The process of producing sponge rubber bodies of extended length, which comprises the steps of placing a body of sponge rubber compound of great length in a flexible tube of substantially larger cross sectional area than the cross sectional area of said compound, and thereafter without the use of a fixed mold, curing the rubber in such tube under conditions which will permit the expansion of the compound to produce sponge rubber and at the same time will cause the expanding compound to stretch the tube to substantially cylindrical shape and place the tube under tension.

4. A process as defined in claim 3, in which the tube is made of cloth.

5. A process as defined in claim 3, in which the compound is cured by passing it progressively through a heated chamber.

6. As a new article of manufacture, a product comprising a piece of fabric of great length formed into a long tube with two projecting edges, and sponge rubber compound expanded into sponge rubber within said tube and integrally united to it by vulcanization.

HARRY M. HOOD.